United States Patent
Yoshida et al.

(10) Patent No.: US 10,051,190 B2
(45) Date of Patent: Aug. 14, 2018

(54) INTERCHANGEABLE LENS, CAMERA SYSTEM, IMAGING APPARATUS, CONTROL METHOD OF CAMERA SYSTEM, AND CONTROL METHOD OF IMAGING APPARATUS IN WHICH THE SIZE OF AN IMAGE CIRCLE VARIES INVERSELY TO THE FOCAL DISTANCE

(71) Applicant: Olympus Corporation, Shibuya-ku, Tokyo (JP)

(72) Inventors: Hideaki Yoshida, Hachioji (JP); Tetsuya Toyoda, Hachioji (JP); Shigeru Kato, Tachikawa (JP); Masaaki Komiya, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/801,297

(22) Filed: Jul. 16, 2015

(65) Prior Publication Data
US 2015/0326780 A1 Nov. 12, 2015

Related U.S. Application Data

(63) Continuation of application No. PCT/JP2014/052223, filed on Jan. 31, 2014.

(30) Foreign Application Priority Data

Feb. 1, 2013 (JP) ................................ 2013-018517

(51) Int. Cl.
*H04N 5/232* (2006.01)
*H04N 5/345* (2011.01)
(Continued)

(52) U.S. Cl.
CPC ....... *H04N 5/23296* (2013.01); *H04N 3/1562* (2013.01); *H04N 5/23216* (2013.01);
(Continued)

(58) Field of Classification Search
None
See application file for complete search history.

(56) References Cited

U.S. PATENT DOCUMENTS

| 5,812,189 A | 9/1998 | Kimura et al. |
| 6,987,532 B1 * | 1/2006 | Kawahara ............. H04N 5/232 |
| | | 348/220.1 |

(Continued)

FOREIGN PATENT DOCUMENTS

| JP | 2002-314872 | 10/2002 |
| JP | 2005277963 A * | 10/2005 |

(Continued)

OTHER PUBLICATIONS

International Search Report to International Application No. PCT/JP2014/052223, dated Apr. 1, 2014 (3 pgs.), with translation (1 pg.).

(Continued)

*Primary Examiner* — Justin P. Misleh
(74) *Attorney, Agent, or Firm* — John C. Pokotylo; Pokotylo Patent Services

(57) ABSTRACT

An interchangeable lens includes an optical system which is variable in focal distance and in which a size of an image circle varies by the focal distance, the image circle being an effective image formation region of an optical image of a subject; a lens data storage unit which stores data indicating a correspondence between a value of the focal distance and a value of the size of the image circle; and a lens interface unit which sends data indicating the correspondence to the imaging apparatus.

18 Claims, 6 Drawing Sheets

(51) Int. Cl.
*H04N 3/14* (2006.01)
*G03B 17/14* (2006.01)
*G02B 15/16* (2006.01)

(52) U.S. Cl.
CPC ......... *H04N 5/3454* (2013.01); *G02B 15/161* (2013.01); *G03B 17/14* (2013.01); *H04N 5/23209* (2013.01)

(56) References Cited

U.S. PATENT DOCUMENTS

| | | | | |
|---|---|---|---|---|
| 2002/0101531 | A1* | 8/2002 | Kaneda ................ | G02B 7/102 348/347 |
| 2005/0128342 | A1* | 6/2005 | Izukawa ........... | H04N 5/23209 348/360 |
| 2006/0221213 | A1* | 10/2006 | Watanabe .............. | G02B 7/102 348/240.3 |
| 2007/0097219 | A1* | 5/2007 | Nomura ............. | H04N 5/23248 348/208.7 |
| 2009/0251554 | A1* | 10/2009 | Kido ...................... | G03B 17/14 348/222.1 |
| 2012/0013997 | A1* | 1/2012 | Yamanaka ............... | G02B 7/10 359/701 |

FOREIGN PATENT DOCUMENTS

| | | |
|---|---|---|
| JP | 2007-074696 | 3/2007 |
| JP | 2009-159549 | 7/2009 |
| JP | 2009-282551 | 12/2009 |
| JP | 2012-147082 | 8/2012 |

OTHER PUBLICATIONS

Written Opinion to International Application No. PCT/JP2014/052223, dated Apr. 1, 2015 (3 pgs.).

English Translation of Written Opinion to International Application No. PCT/JP2014/052223, with associated Notification and International Preliminary Report on Patentability cover sheet, dated Apr. 1, 2014 (6 pgs.).

First Office Action to corresponding Japanese Patent Application No. 2013-018517, dated Sep. 6, 2016 (3 pgs.), with translation (3 pgs.).

Supplementary European Search Report to corresponding European Patent Application No. EP 14 74 6039, dated Oct. 5, 2016 (8 pgs.).

Japanese Decision of Rejection to corresponding Japanese Patent Application No. 2013-018517, dated Apr. 4, 2017 (3 pgs.), with translation (3 pgs.).

First Office Action to corresponding Chinese Patent Application No. 201480004923.2, dated May 2, 2017 (11 pgs.), with translation (30 pgs.).

\* cited by examiner

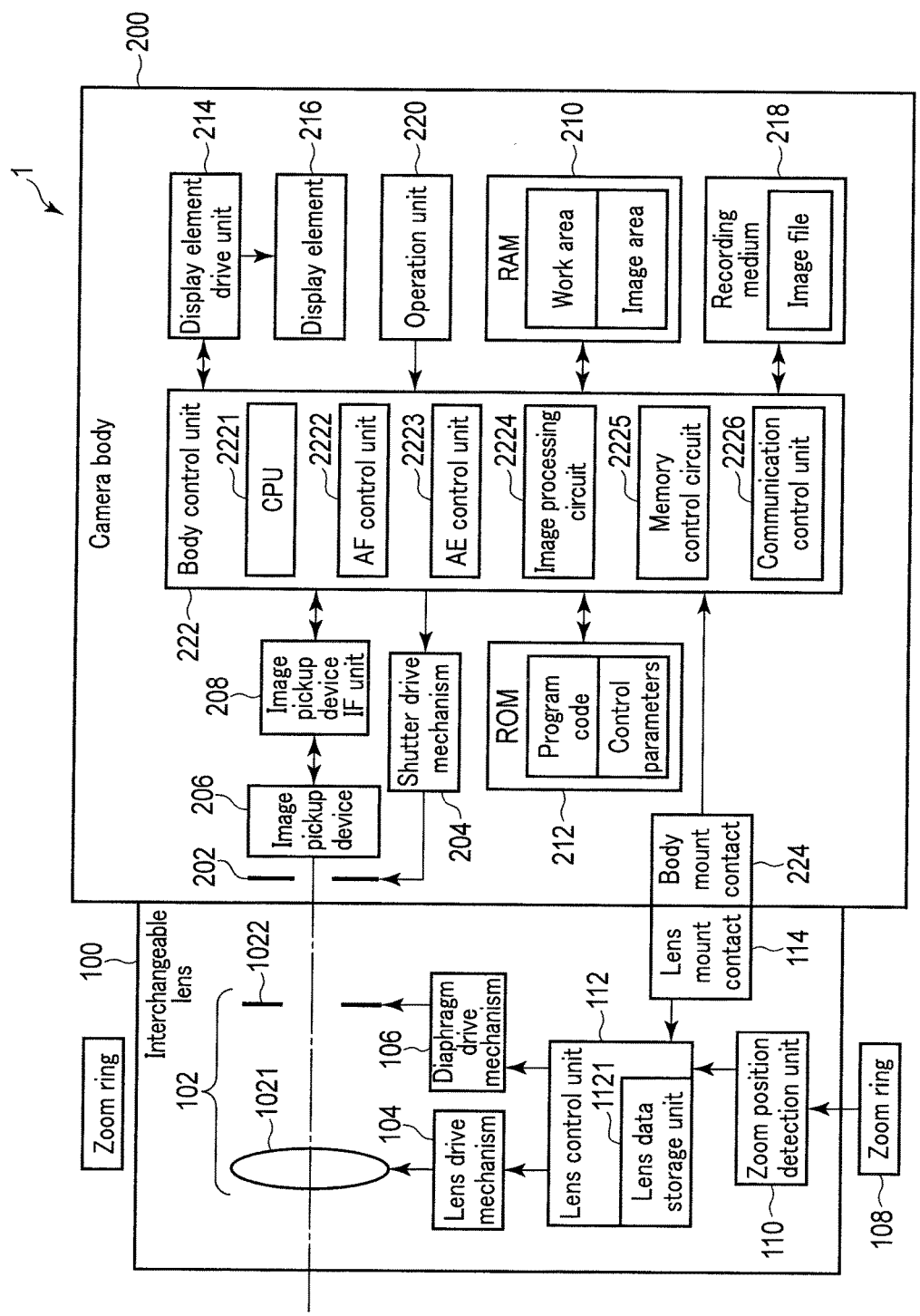
F I G. 1

INTERCHANGEABLE LENS, CAMERA SYSTEM, IMAGING APPARATUS, CONTROL METHOD OF CAMERA SYSTEM, AND CONTROL METHOD OF IMAGING APPARATUS IN WHICH THE SIZE OF AN IMAGE CIRCLE VARIES INVERSELY TO THE FOCAL DISTANCE

CROSS-REFERENCE TO RELATED APPLICATIONS

This application is a Continuation application of PCT Application No. PCT/JP2014/052223, filed Jan. 31, 2014 and based upon and claiming the benefit of priority from the prior Japanese Patent Application No. 2013-018517, filed Feb. 1, 2013, the entire contents of both of which are incorporated herein by reference.

BACKGROUND OF THE INVENTION

1. Field of the Invention

The present invention relates to an interchangeable lens, a camera system, an imaging apparatus, a control method of a camera system, and a control method of an imaging apparatus.

2. Description of the Related Art

The size reduction of an optical system mounted on an imaging apparatus is one of the greatest challenges in the imaging apparatus. In particular, an optical system having a high zoom ratio that achieves what is known as telescopic high power tends to be large in principle, and is therefore required to be as small as possible.

A technique that combines optical zoom with electronic zoom is known as one of techniques to achieve the telescopic high power with a relatively small lens (e.g., Jpn. Pat. Appln. KOKAI Publication No. 2002-314872). The electronic zoom is processing for cutting out a region in part of image data acquired via an image pickup device, and enlarging the cut-out region in accordance with a necessary zoom ratio. It is possible to record image data having a practical zoom ratio that exceeds the limit of the optical zoom by combining the optical zoom with the electronic zoom.

BRIEF SUMMARY OF THE INVENTION

An interchangeable lens according to a first aspect of the invention is an interchangeable lens which is attached to and detached from an imaging apparatus including an image pickup device, the interchangeable lens comprising: an optical system which is variable in focal distance and in which a size of an image circle varies by the focal distance, the image circle being an effective image formation region of an optical image of a subject; a lens data storage unit which stores data indicating a correspondence between a value of the focal distance and a value of the size of the image circle; and a lens interface unit which sends data indicating the correspondence to the imaging apparatus.

A camera system according to a second aspect of the invention is a camera system having an interchangeable lens and an imaging apparatus which the interchangeable lens is attached to or removed from, the interchangeable lens comprising an optical system which is variable in focal distance and in which a size of an image circle varies by the focal distance, the image circle being an effective image formation region of an optical image of a subject, a lens data storage unit which stores data indicating a correspondence between a value of the focal distance and a value of the size of the image circle, and a lens interface unit which sends data indicating the correspondence to the imaging apparatus, the imaging apparatus comprising an imaging unit which obtains image data from the optical image formed on an image pickup device via the optical system, an apparatus interface unit which receives the data indicating the correspondence from the lens interface unit, and an image processing unit which cuts out image data corresponding to the image circle among image data obtained by the imaging unit on the basis of the data indicating the correspondence received by the apparatus interface unit and subjects the cut-out image data to changing processing having a magnification based on the data indicating the correspondence received by the apparatus interface unit.

An imaging apparatus according to a third aspect of the invention is an imaging apparatus comprising: an optical system which is variable in focal distance and in which a size of an image circle varies by the focal distance, the image circle being an effective image formation region of an optical image of a subject; a data storage unit which stores data indicating a correspondence between a value of the focal distance and a value of the size of the image circle; an imaging unit which obtains image data from the optical image formed on an image pickup device via the optical system; and an image processing unit which cuts out image data corresponding to the image circle among image data obtained by the imaging unit on the basis of the data indicating the correspondence and subjects the cut-out image data to changing processing having a magnification based on the data indicating the correspondence.

An imaging apparatus according to a fourth aspect of the invention is an imaging apparatus comprising: an optical system which is variable in focal distance and in which a size of an image circle varies by the focal distance, the image circle being an effective image formation region of an optical image of a subject; an imaging unit which obtains image data from the optical image formed on an image pickup device via the optical system; and an image processing unit which cuts out image data in a relatively small region corresponding to a relatively high value of the focal distance and subjects the cut-out image data to changing processing having a relatively high magnification.

A control method lens according to a fifth aspect of the invention a control method of a camera system including an interchangeable lens and an imaging apparatus which the interchangeable lens is attached to or removed from, the interchangeable lens comprising an optical system which is variable in focal distance and in which a size of an image circle varies by the focal distance, the image circle being an effective image formation region of an optical image of a subject, and a lens data storage unit which stores data indicating a correspondence between a value of the focal distance and a value of the size of the image circle, the imaging apparatus comprising an imaging unit which obtains image data from the optical image formed on an image pickup device via the optical system, the control method comprising: cutting out image data corresponding to the image circle among image data obtained by the imaging unit on the basis of the data indicating the correspondence received by the apparatus interface unit and the focal distance of the optical system; and subjecting the cut-out image data to changing processing having a magnification based on the data indicating the correspondence.

A control method according to a sixth aspect of the invention is a control method of an imaging apparatus having an imaging unit which obtains image data from an optical image formed on an image pickup device, the imaging apparatus comprising an optical system which is variable in focal distance and in which a size of an image circle varies by the focal distance, the image circle being an effective image formation region of an optical image of a subject, and a lens data storage unit which stores data indicating a correspondence between a value of the focal distance and a value of the size of the image circle, the control method comprising: cutting out image data corresponding to the image circle among image data obtained by the imaging unit on the basis of the data indicating the correspondence and the focal distance of the optical system; and subjecting the cut-out image data to changing processing having a magnification based on the data indicating the correspondence.

A control method according to a seventh aspect of the invention is a control method of an imaging apparatus which obtains image data from an optical image formed on an image pickup device, the imaging apparatus comprising an optical system which forms an optical image on the image pickup device and which is variable in focal distance and in which a size of an image circle varies by the focal distance, the image circle being an effective image formation region of an optical image of a subject, the control method comprising: cutting out image data in a relatively small region corresponding to a relatively high value of the focal distance; and subjecting the cut-out image data to changing processing having a relatively high magnification.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 1 is a diagram showing the configuration of a digital camera as an example of an imaging apparatus comprising an interchangeable lens according to one embodiment of the present invention;

DETAILED DESCRIPTION OF THE INVENTION

Figure 2:
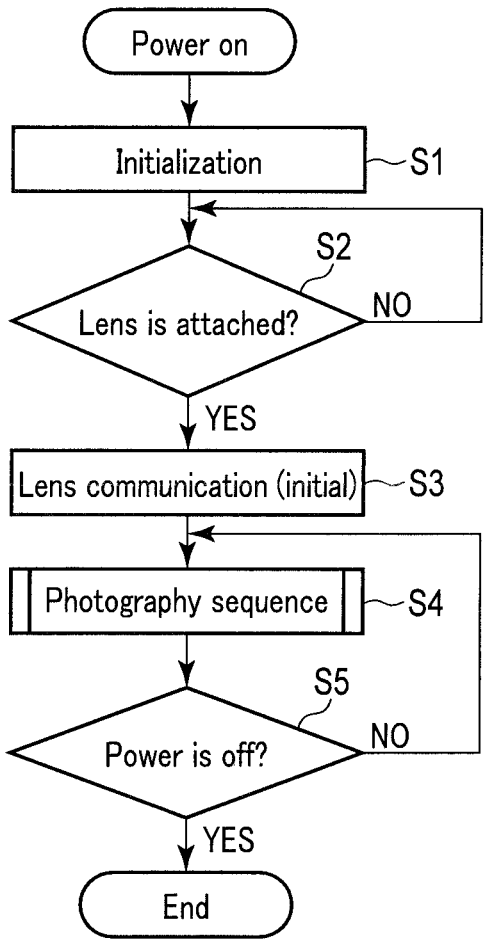
FIG. 2 is a flowchart showing the main operation of the digital camera.

Hereinafter, an embodiment of the present invention will be described with reference to the drawings.

FIG. 1 is a diagram showing the configuration of a digital camera (hereinafter briefly referred to as a camera) as an example of an imaging apparatus comprising an interchangeable lens according to one embodiment of the present invention. A camera 1 shown in FIG. 1 has an interchangeable lens 100 and a camera body 200. The interchangeable lens 100 is configured to attached to and detached from the camera body 200. When the interchangeable lens 100 is attached to the camera body 200, the interchangeable lens 100 is connected to the camera body 200 in communication with each other. As a result, the interchangeable lens 100 is operable under the control of the camera body 200.

The interchangeable lens 100 has an optical system 102, a lens drive mechanism 104, a diaphragm drive mechanism 106, a zoom ring 108, a zoom position detection unit 110, a lens control unit 112, and a lens mount contact 114.

The optical system 102 is an optical system for forming a light ray from an unshown subject into an image on an imaging surface of an image pickup device 206 provided in the camera body 200. The optical system 102 has a photographic lens 1021 and a diaphragm 1022.

The photographic lens 1021 includes one or more lenses which are variable in focal distance and which are designed to change the size of an image circle in accordance with the change of the focal distance. Specifically, the photographic lens 1021 in the example according to the present embodiment is designed so that the photographic lens 1021 is driven along an optical axis direction indicated by a dashed line in FIG. 1 to change its focal distance and so that the image circle may be reduced in size as the focal distance becomes longer.

The diaphragm 1022 is configured to open and close, and adjusts the amount of the light ray entering the image pickup device 206 via the photographic lens 1021.

The lens drive mechanism 104 has a motor and its drive circuit or the like. Under the control of the lens control unit 112, the lens drive mechanism 104 drives the photographic lens 1021 in its optical axis direction (in the dashed-line direction in FIG. 1).

The diaphragm drive mechanism 106 has a drive mechanism for driving the diaphragm 1022. This diaphragm drive mechanism 106 drives the diaphragm 1022 under the control of the lens control unit 112.

The zoom ring 108 is an operation member provided rotatably along the outer circumference of the body of the interchangeable lens 100. The zoom position detection unit 110 is, for example, an encoder configured to detect the operation amount of the zoom ring 108. This zoom position detection unit 110 inputs the operation amount of the zoom ring 108 to the lens control unit 112 as information regarding the focal distance (zoom position) of the photographic lens 1021.

The lens control unit 112 is connected to a body control unit 222 of the camera body 200 in communication with each other via the lens mount contact 114 and a body mount contact 224. This lens control unit 112 controls the lens drive mechanism 104 and the diaphragm drive mechanism 106 in accordance with the input from the body control unit 222 and the input from the zoom position detection unit 110. The lens control unit 112 has a lens data storage unit 1121 which is, for example, a flash memory. The lens data storage unit 1121 stores lens data regarding, for example, aberration characteristics of the optical system 102. The lens data storage unit 1121 according to the present embodiment stores correspondence table data between the value of the focal distance of the photographic lens 1021 and the value of the size (e.g., diameter) of the image circle. Details of this correspondence table data will be described later.

The lens mount contact 114 is a contact provided in a mount portion of the interchangeable lens 100. The lens mount contact 114 is electrically connected to the body mount contact 224 when the interchangeable lens 100 is attached to the camera body 200, and functions as a lens interface unit for the communication between the interchangeable lens 100 and the camera body 200.

The camera body 200 has a shutter 202, a shutter drive mechanism 204, the image pickup device 206, an image pickup device interface (IF) unit 208, a RAM 210, a ROM 212, a display element drive unit 214, a display element 216, a recording medium 218, an operation unit 220, the body control unit 222, and the body mount contact 224.

The shutter 202 is configured so that the imaging surface of the image pickup device 206 is shielded from or exposed to light. The exposure time of the image pickup device 206 is adjusted by the shutter 202. The shutter drive mechanism 204 has a drive mechanism for driving the shutter 202, and drives the shutter 202 under the control of the body control unit 222.

The image pickup device 206 has the imaging surface on which the light ray from the subject collected via the optical system 102 is formed into an image. The imaging surface of the image pickup device 206 is composed of two-dimensionally arranged pixels. A color filter is provided on the light entrance side of the imaging surface. This image pickup device 206 converts a figure (subject figure) corresponding the light ray formed into the image on the imaging surface into an electric signal (hereinafter referred to as an image signal) corresponding to the light amount of the figure.

The image pickup device IF unit 208 which functions as an imaging unit together with the image pickup device 206 drives the image pickup device 206 under the control of the body control unit 222. The image pickup device IF unit 208 reads the image signal obtained by the image pickup device 206 under the control of the body control unit 222, and subjects the read image signal to analog processing such as correlated double sampling (CDS) processing and automatic gain control (AGC) processing. The image pickup device IF unit 208 further converts the analog-processed image signal into a digital signal (hereinafter referred to as image data).

The RAM 210 is, for example, an SDRAM, and has a work area and an image area as storage areas.

The work area is the storage area provided in the RAM 210 to temporarily store various calculation data generated in each of the units in the camera body 200.

The image area is the storage area provided in the RAM 210 to temporarily store the image data obtained by the image pickup device IF unit 208 and the image data generated in each of the units in the camera body 200 such as image data being processed.

The ROM 212 is, for example, a flash memory, and stores a program code for a CPU 2221 of the body control unit 222 to perform various processes. The ROM 212 also stores various control parameters; for example, a control parameter necessary for the operation of the image pickup device 206, and a control parameter necessary for the image processing in an image processing circuit 2224 of the body control unit 222.

The display element drive unit 214 drives the display element 216 on the basis of the image data input from the body control unit 222, and displays an image on the display element 216. The display element 216 is, for example, a liquid crystal display (LCD), and displays various images such as images for live views and images recorded in the recording medium 218.

The recording medium 218 is, for example, a memory card, and records an image file obtained by a photographic operation. The image file is a file having a configuration in which a given header is attached to the image data. For example, data indicating a photographic condition is stored in the header as tag data.

The operation unit 220 has operation members for a user to perform various operations of the camera body 200. The operation members include, for example, a release button, a menu button, and a power button. The release button is an operation member for the user to instruct the camera body 200 to start still image photography. When this release button is pressed halfway, a 1st release switch is turned on so that instructions for automatic exposure (AE) processing and automatic focus (AF) processing are given to the body control unit 222. When the release button is fully pressed, a 2nd release switch is turned on so that an instruction for a photography (still image recording) operation is given to the body control unit 222. The menu button is an operation member for issuing an instruction to display a menu screen for setting various modes of the camera body 200. The user can perform various settings regarding the camera body 200 on the menu screen. The various settings include setting of a record pixel number which is the number of pixels in the image data to be recorded in, for example, the recording medium 218. The power button is an operation member for the user to instruct the camera body 200 to turn on or off power.

The body control unit 222 has the CPU 2221, an AF control unit 2222, an AE control unit 2223, the image processing circuit 2224, a memory control circuit 2225, and a communication control unit 2226, as control circuits for controlling the operation of the camera body 200.

The CPU 2221 is a control unit for controlling the operation of each of the blocks outside the body control unit 222, for example, the shutter drive mechanism 204, the image pickup device IF unit 208, and the display element drive unit 214, the operation of the lens control unit 112, and the operation of each of the control circuits of the body control unit 222.

The AF control unit 2222 controls AF processing. The AF processing is, for example, contrast AF processing. Specifically, the AF control unit 2222 extracts high-frequency components of the image data obtained in the image pickup device IF unit 208, adds up the extracted high-frequency components, and thereby acquires an in-focus evaluation value for AF for each AF area. The CPU 2221 evaluates the contrast of the image data in accordance with this in-focus evaluation value, and also controls the lens control unit 112 to bring the photographic lens 1021 into focus.

The AE control unit 2223 controls AE processing. Specifically, the AE control unit 2223 uses the image data obtained in the image pickup device IF unit 208 to calculate a subject luminance. In accordance with this subject luminance, the CPU 2221 calculates the aperture amount (aperture value) of the diaphragm 1022 during exposure, a release time (shutter speed value) of the shutter 202, and the sensitivity of the image pickup device 206.

The image processing circuit 2224 performs image processing on the image data. The image processing includes, for example, color correction processing, gamma correction processing, and compression processing. The image processing circuit 2224 also decompresses compressed image data. Moreover, the image processing circuit 2224 according to the present embodiment performs electronic zoom processing as image processing. The electronic zoom processing is processing which entirely or partly cuts out and uses the image data and enlarges or reduces the image data in accordance with prescribed magnification. For example, a bilinear method and a bicubic method are known as the magnification changing (enlargement or reduction) method. However, these methods are not restrictions. Moreover, the image processing circuit 2224 is preferably capable of super-resolution processing at the time of enlargement in the electronic zoom processing. The super-resolution processing is processing which uses a local similarity of the image to generate an enlarged image including frequency components that do not exist in the original image. Details of the super-resolution processing are not described here.

The memory control circuit 2225 controls when, for example, the CPU 2221 accesses the RAM 210, the ROM 212, and the recording medium 218.

The communication control unit 2226 controls when, for example, the CPU 2221 of the body control unit 222 communicates with the lens control unit 112.

The body mount contact 224 is a contact provided in the mount portion of the camera body 200. This body mount contact 224 is electrically connected to the lens mount contact 114 when the interchangeable lens 100 is attached to the camera body 200, and functions as an apparatus interface unit for the communication between the interchangeable lens 100 and the camera body 200.

Now, the operation of the camera 1 according to the present embodiment is described. FIG. 2 is a flowchart showing the main operation of the camera 1. When the power of the camera 1 is turned on, the processing in the flowchart of FIG. 2 is started. At the same time, the CPU 2221 reads the necessary program code from the ROM 212 to control the operation in FIG. 2. When the operation of the zoom ring 108 by the user is detected via the zoom position detection unit 110 as an operation independent of the operation in FIG. 2, the lens control unit 112 controls the lens drive mechanism 104 in accordance with the operation amount of the zoom ring 108 to drive the photographic lens 1021.

In S1, the CPU 2221 performs initialization processing of the camera body 200. As the initialization processing, the CPU 2221 resets data set in its register. In addition, the CPU 2221 also performs processing for resetting data in the RAM.

In S2, the CPU 2221 determines whether the interchangeable lens 100 is attached at present. For example, when there is a response from the interchangeable lens 100 in a communication attempted via the body mount contact 224, it can be determined that the interchangeable lens 100 is attached. Otherwise, the attachment may be detected by a mechanical switch.

When it is determined in S2 that the interchangeable lens 100 is not attached, the CPU 2221 waits for processing. When it is determined in S2 that the interchangeable lens 100 is not attached, the CPU 2221 performs an initial communication with the interchangeable lens 100. In this initial communication, the CPU 2221 requests the lens control unit 112 to send lens data. In response to this sending request, the lens control unit 112 reads the lens data including table data from the lens data storage unit 1121 and then outputs the lens data to the camera body 200. The lens data received by the camera body 200 is stored in, for example, a work area of the RAM 210.

In S4, the CPU 2221 performs processing of a photography sequence. This processing of the photography sequence will be described in detail later.

In S5, the CPU 2221 determines whether the power of the camera 1 is turned off. When it is determined in S5 that the power of the camera 1 is not turned off, the CPU 2221 returns the processing to S4 to continue the processing of the photography sequence. When it is determined in S5 that the power of the camera 1 is turned off, the CPU 2221 ends the processing in FIG. 2.

Figure 3:
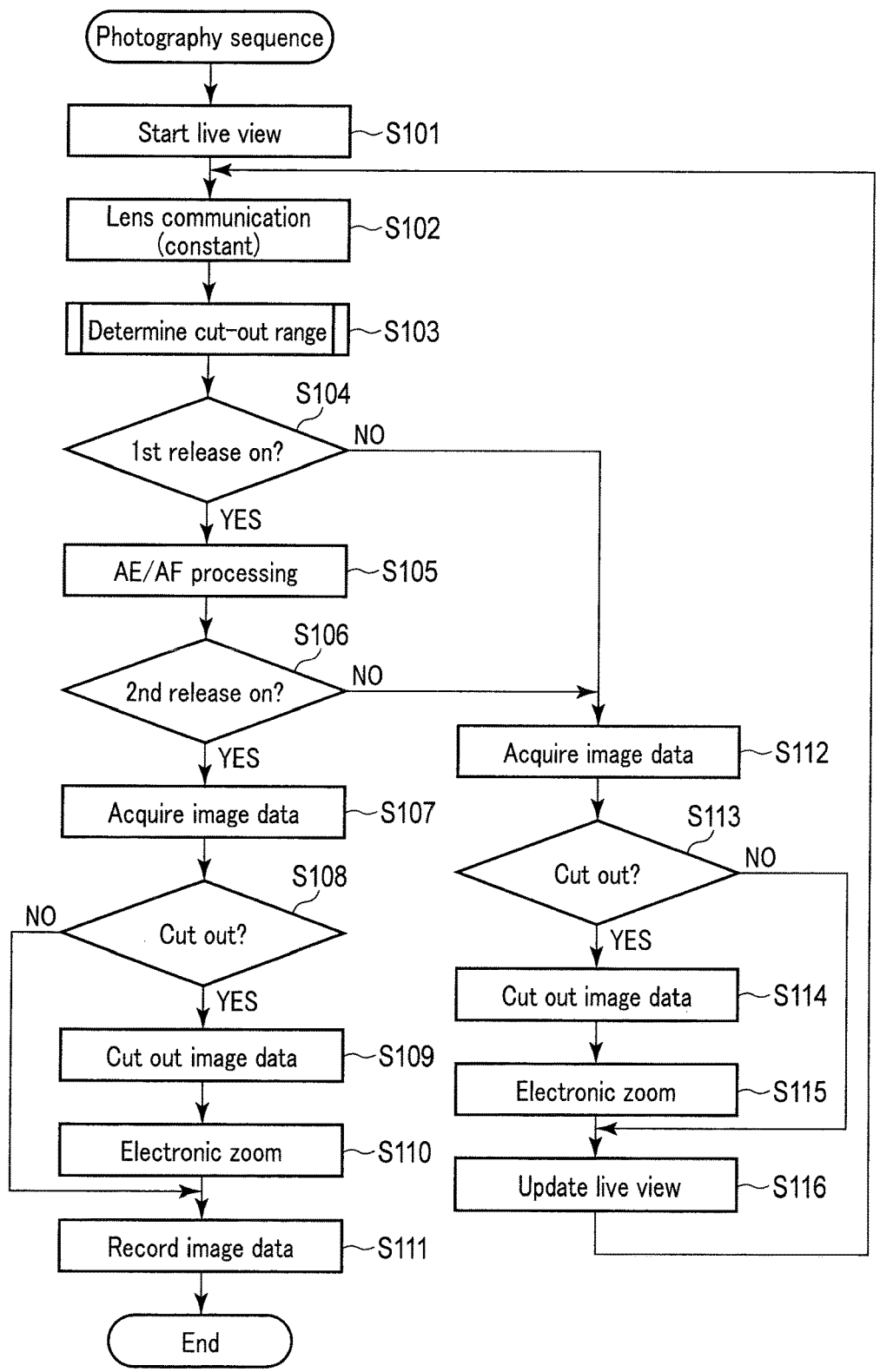
FIG. 3 is a flowchart showing processing of a photography sequence.

FIG. 3 is a flowchart showing the processing of the photography sequence. When the processing of the photography sequence is started, the CPU 2221 starts a live-view operation in S101. As the live-view operation, the CPU 2221 controls the shutter drive mechanism 204 to open the shutter 202, and then controls the image pickup device IF unit 208 to start imaging by the image pickup device 206. The CPU 2221 then inputs the image data stored in the image area of the RAM 210 to the image processing circuit 2224 as the result of the imaging by the image pickup device 206 to subject the image data to the image processing (e.g., the color correction processing, the gamma correction processing). The CPU 2221 then inputs the image data subjected to the image processing for live-view display to the display element drive unit 214, and displays an image on the display element 216.

In S102, the CPU 2221 communicates with the interchangeable lens 100. In this communication, the CPU 2221 requests the lens control unit 112 to send a focal distance (zoom position). In response to this sending request, the lens control unit 112 outputs, to the camera body 200, information regarding the focal distance of the photographic lens 1021 calculated from the operation amount of the zoom ring 108 detected by the zoom position detection unit 110. The information regarding the focal distance received by the camera body 200 is stored in, for example, the work area of the RAM 210.

In S103, the CPU 2221 performs cut-out range determining processing. As described above, in the present embodiment, the image circle becomes smaller as the focal distance of the photographic lens 1021 becomes longer. In general, a region which can be regarded as an effective pixel on the image pickup device 206 becomes smaller as the image circle becomes smaller. The effective pixel is a pixel with an output that can be effectively used for display and recording among the pixels of the image pickup device 206. In the present embodiment, the reduction of the effective pixels resulting from the size reduction of the image circle is corrected by use of the electronic zoom processing. The cut-out range determining processing is processing for determining a cut-out range for this electronic zoom processing. Details of the cut-out range determining processing will be described later.

In S104, the CPU 2221 determines whether the 1st release switch is turned on. When it is determined in S104 that the 1st release switch is not turned on, the CPU 2221 moves the processing to S112. When it is determined in S104 that the 1st release switch is turned on, the CPU 2221 performs the AE processing and the AF processing in S105.

In S106, the CPU 2221 determines whether the 2nd release switch is turned on. When it is determined in S106 that the 2nd release switch is not turned on, the CPU 2221 moves the processing to S112.

When it is determined in S106 that the 2nd release switch is turned on, the CPU 2221 performs imaging processing for still image recording in S107. At the same time, the CPU 2221 controls the shutter drive mechanism 204 to close the shutter 202. The CPU 2221 then controls the lens control unit 112 to narrow down the diaphragm 1022 to the aperture value calculated during the AE processing. The CPU 2221 then controls the shutter drive mechanism 204 to release the shutter 202 for the release time calculated during the AE processing and also performs imaging (exposure) by the image pickup device 206. As a result, image data is stored in the image area of the RAM 210.

In S108, the CPU 2221 determines whether there is cut-out processing of the image data. Although described in detail later, there is cut-out processing of the image data except when the focal distance is the shortest (focal distance corresponding to a wide end) in the example according to the present embodiment.

When it is determined in S108 that there is no cut-out processing of the image data, the CPU 2221 moves the processing to S111. When it is determined in S108 that there is cut-out processing of the image data, the CPU 2221 causes the image processing circuit 2224 to perform the cut-out processing of the image data in S109. Accordingly, the image processing circuit 2224 cuts out, from the image data stored in the image area of the RAM 210, the image data in the cut-out range determined in S103. The image data cut out after the processing in S109 is stored in the image area of the RAM 210.

In S110, the image processing circuit 2224 subjects the cut-out image data to the electronic zoom processing. Details of the electronic zoom processing will be described later.

In S111, the CPU 2221 performs recording processing of the image data. The CPU 2221 then ends the processing in FIG. 3. As specific processing in S111, the CPU 2221 causes the image processing circuit 2224 to perform the image processing of the image data stored in the image area of the RAM 210. Accordingly, the image processing circuit 2224 acquires the image data stored in the image area of the RAM 210 (the image data after the electronic zoom when subjected to the electronic zoom processing), and subjects the acquired image data to the image processing (e.g., the color correction processing, the gamma correction processing, compression processing). The CPU 2221 then provides a header to the image data processed in the image processing circuit 2224 to generate an image file, and records the generated image file in the recording medium 218.

In S112, the CPU 2221 performs imaging processing for live-view update by the image pickup device 206. As a result, the image data is stored in the image area of the RAM 210.

In S113, the CPU 2221 determines whether there is cut-out processing of the image data. The determination in S113 is made in the same manner as in S108.

When it is determined in S113 that there is no cut-out processing of the image data, the CPU 2221 moves the processing to S116. When it is determined in S113 that there is cut-out processing of the image data, the CPU 2221 causes the image processing circuit 2224 to perform the cut-out processing of the image data in S114. Accordingly, the image processing circuit 2224 cuts out, of the image data stored in the image area of the RAM 210, the image data in the cut-out range determined in S103. The image data cut out after the processing in S114 is stored in the image area of the RAM 210.

In S115, the image processing circuit 2224 subjects the cut-out image data to the electronic zoom processing. Details of the electronic zoom processing will be described later.

In S116, the CPU 2221 updates the live view. The CPU 2221 then returns the processing to S102. As specific processing in S116, the CPU 2221 inputs the image data acquired in S112 or the image data subjected to the electronic zoom processing in S115 to the image processing circuit 2224 to subject the image data to the image processing (e.g., the color correction processing, the gamma correction processing). The CPU 2221 then inputs the image data subjected to the image processing for live-view display to the display element drive unit 214, and displays an image on the display element 216.

Figure 4:
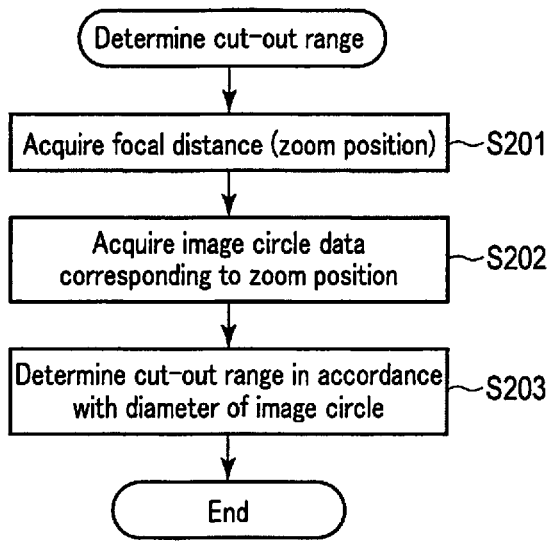
FIG. 4 is a flowchart showing cut-out range determining processing.

Now, the cut-out range determining processing and the electronic zoom processing are described. FIG. 4 is a flowchart showing the cut-out range determining processing. If the cut-out range determining processing is started, the CPU 2221 acquires, in S201, information regarding the focal distance (zoom position) which is stored in the image area of the RAM 210 as a result of a lens communication.

In S202, the CPU 2221 acquires data regarding the size of the image circle corresponding to the focal distance by referring to, from the RAM 210, the table data acquired by the lens communication.

Figure 5:
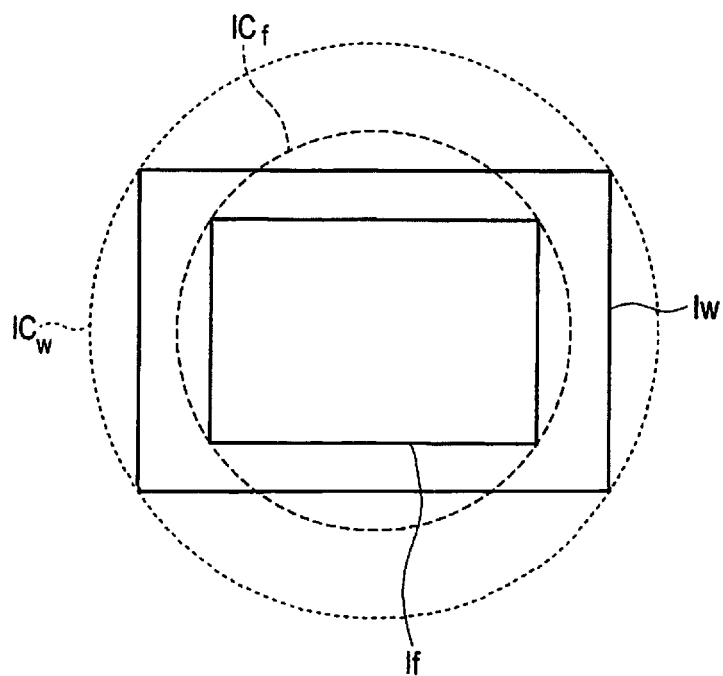
FIG. 5 is a diagram showing the relation between image circles and a cut-out region.

FIG. 5 is a diagram showing the relation between image circles and a cut-out region in the present embodiment. As described above, in the present embodiment, the size of the image circle changes in accordance with the change of the focal distance. The changing of the image circle means the changing of the size of a region (hereinafter referred to as an effective pixel region) which can be regarded as an effective pixel on the image pickup device 206. For example, if an image circle at a focal distance $f_W$ corresponding to the wide end is $IC_W$ in FIG. 5, an effective pixel region corresponding to the image circle $IC_W$ is a region within a range $I_W$ (e.g., corresponding to the entire pixel range of the image pickup device 206) inscribed in the image circle $IC_W$. Therefore, if the image data in the range $I_W$ is cut out, the cut-out image data can be treated as the image data of the effective pixels. In contrast, an image circle at a focal distance f, which is a focal distance longer than the focal distance $f_W$ corresponding to the wide end, is an image circle $IC_f$ smaller than the image circle $IC_W$. Thus, an effective pixel region corresponding to the image circle $IC_f$ is a region within a range $I_f$ smaller than the effective pixel region corresponding to the image circle $IC_W$. Therefore, if the image data in the range $I_f$ is cut out, the cut-out image data can be treated as the image data of the effective pixels. Thus, in the present embodiment, the range of the image data to be cut out varies according to the size (e.g., diameter) of the image circle, so that data in which the value of the focal distance is associated with the value of the size of the image circle is stored in the interchangeable lens 100.

Figure 6:
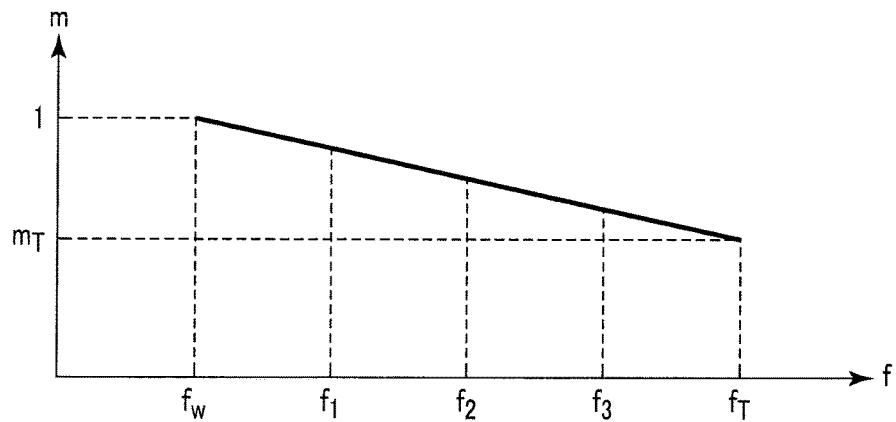
FIG. 6 is a graph showing an example of correspondence data between the value of focal distance and the value of the size of the image circle.

FIG. 6 is a graph illustrating an example of correspondence data between the value of the focal distance and the value of the size of the image circle. Here, f indicated by the horizontal axis in FIG. 6 is the focal distance. m indicated by the vertical axis in FIG. 6 corresponds to the value of the size (e.g., diameter) of the image circle. However, m is standardized so that the value at the focal distance $f_W$ corresponding to the wide end may be a standard value (1 in FIG. 6). m will hereinafter be referred to as a circle diameter magnification.

FIG. 6 is an example in which the photographic lens 1021 is designed so that the value of the circle diameter magnification m may lineally change from 1 to $m_T$ relative to the focal distance f. This straight-line equation is represented by (Equation 1) below.

$$m = \left(\frac{1 - m_T}{f_W - f_T}\right)f + \left(\frac{m_T f_W - f_T}{f_W - f_T}\right) \quad \text{(Equation 1)}$$

The value of $m_T$ in FIG. 6 is a circle diameter magnification at a focal distance $f_T$ corresponding to a tele end, and is suitably determined by the design of the photographic lens 1021. For example, if the value of $m_T$ is 0.7, the size (area) of the image circle changes between one time and ½ times.

The coordinate values (f, m) of linear points shown in FIG. 6 are stored in the lens data storage unit 1121 as the correspondence table data between the value of the focal distance and the value of the size of the image circle. The values of the circle diameter magnification m corresponding to the values of all the focal distances that can be taken by the photographic lens 1021 may be stored, or the values of the circle diameter magnification m corresponding to the values of some of the focal distances may be stored. When only some of the values are stored, the circle diameter magnification m corresponding to the value of the focal distance that is needed may be calculated by linear interpolation. Moreover, an expression that represents the straight line in FIG. 6 may be stored.

Here, FIG. 6 shows an example in which the photographic lens 1021 is designed so that the circle diameter magnification m may linearly change relative to the focal distance f. However, it is not always necessary to design the photographic lens 1021 so that the circle diameter magnification m may linearly change relative to the focal distance f, and the photographic lens 1021 may be designed so that the circle diameter magnification m may curvedly change. The photographic lens 1021 may also be designed so that the circle diameter magnification m=1 can be maintained up to a given focal distance. This corresponds to the case where the photographic lens 1021 is designed so that the size of the image circle $IC_W$ corresponding to the wide end may be sufficiently large compared to the whole pixel range of the image pickup device 206.

In S203, the CPU 2221 determines a cut-out range in accordance with the acquired data regarding the diameter of the image circle.

The cut-out range is determined in accordance with a circle diameter magnification $m_n$ (the subscript n indicates the focal distance). For example, if it is supposed that the imaging center of the image pickup device 206 corresponds to the optical axis of the photographic lens 1021, a rectangular range having a horizontal pixel number $Ph_n$ and a vertical pixel number $Pv_n$ is designated as a cut-out range around the imaging center as a diagonal center. Here, $Ph_n$ and $Pv_n$ are respectively defined by (Equation 2) below. It should be noted that Ph0 and Pv0 in (Equation 2) are record pixel numbers.

$$Ph_n = Ph0 \cdot m_n$$

$$Pv_n = Pv0 \cdot m_n \quad \text{(Equation 2)}$$

If cutout is performed in accordance with (Equation 2), image data corresponding to the effective pixels can be used for recording and display even when the image circle is smaller. In the example of FIG. 6, $m_W=1$ when the focal distance f corresponds to the wide end. In this case, it is not necessary to perform cutout for the electronic zoom processing.

Now, the electronic zoom processing is described. As obvious from (Equation 2), the effective pixel region becomes smaller if the image circle is smaller. Therefore, the electronic zoom processing is performed to horizontally and vertically enlarge the image data after the cutout $1/m_n$ times so that the number of pixels in the image data after the cutout may correspond to the record pixel number. This electronic zoom processing is the processing in S110 and S115. Here, it is preferable to perform the super-resolution processing together at the time of the electronic zoom processing. Especially when the focal distance is long, the number of pixels that can be used in the electronic zoom processing is relatively small, so that the use of the super-resolution processing is advantageous.

Although the record pixel number is adapted to an effective pixel number at the focal distance f corresponding to the wide end in the example described above, the actual record pixel number is not limited to this. Generally, various record pixel numbers are often selectable by mode switch even in one camera. Therefore, when the record pixel number is small, the electronic zoom processing is not limited to enlargement processing and can also include reduction processing. Depending on the record pixel number, the reduction processing alone may be performed in the electronic zoom processing. The enlargement processing and the reduction processing in this case may be directly performed. Alternatively, the enlargement processing is once performed, and the image data after the cutout are formed in the same number of pixels, and then uniform reduction processing may be performed.

The record pixel number is generally larger than the number of pixels in the display element 216. Therefore, in the live-view operation, the image data is enlarged after the electronic zoom processing, and then subjected to the reduction processing in accordance with the number of pixels in the display element 216. The values of Ph0 and Pv0 may vary between recording and the live view.

As described above, according to the present embodiment, it is possible to reduce the size of the variable-focus optical system by using the optical system in which the size of the image circle changes in accordance with the change of the focal distance. The reasons are described below.

Figure 7A:
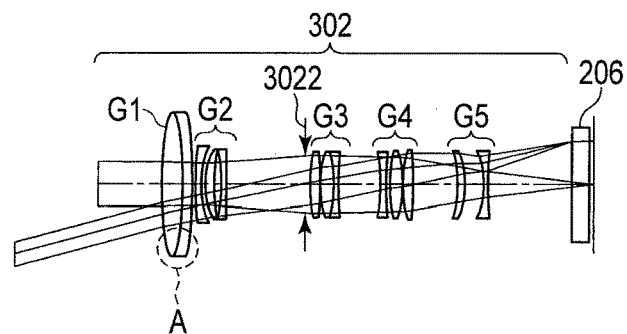
FIG. 7A is a diagram showing a situation in which the focal distance of the optical system designed not to change the size of the image circle in accordance with the change of the focal distance corresponds to a wide end.
Figure 7B:
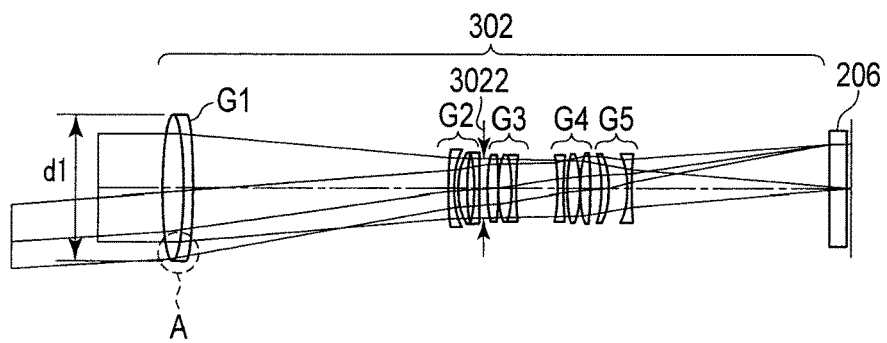
FIG. 7B is a diagram showing a situation in which the focal distance of the optical system designed not to change the size of the image circle in accordance with the change of the focal distance corresponds to a tele end.
Figure 7C:
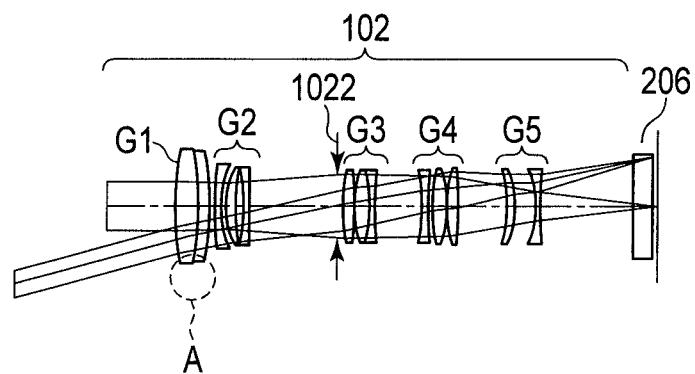
FIG. 7C is a diagram showing a situation in which the focal distance of the optical system designed to change the size of the image circle in accordance with the change of the focal distance corresponds to the wide end.
Figure 7D:
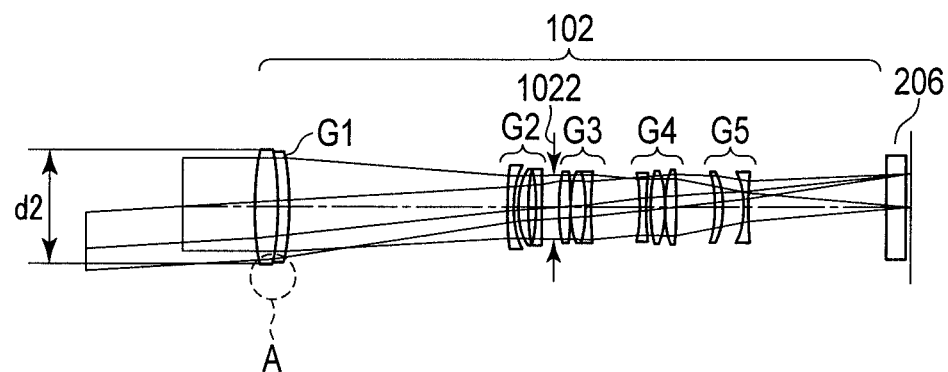
FIG. 7D is a diagram showing a situation in which the focal distance of the optical system designed to change the size of the image circle in accordance with the change of the focal distance corresponds to the tele end.

FIG. 7A, FIG. 7B, FIG. 7C, and FIG. 7D are diagrams showing, by comparison, an optical system 302 designed not to change the size of the image circle in accordance with the change of the focal distance and the optical system 102 designed to change the size of the image circle in accordance with the change of the focal distance. FIG. 7A and FIG. 7B show the optical system 302. The focal distance corresponds to the wide end in FIG. 7A, and the focal distance corresponds to the tele end in FIG. 7B. FIG. 7C and FIG. 7D show the optical system 102. The focal distance corresponds to the wide end in FIG. 7C, and the focal distance corresponds to the tele end in FIG. 7D. Each of the optical systems 302 and 102 shows configuration examples by five groups of lenses G1 to G5. Diaphragms 3022 and 1022 are arranged in the optical paths of the five groups of lenses G1 to G5. Here, the numbers of lens groups constituting the optical system is one example.

The optical system 302 and the optical system 102 can increase the focal distance by mainly letting out the first group lens G1 to the subject side (the left side in the drawings). The other lens groups are used to mainly correct aberration or focus.

Here, to design the optical system so that the size of the image circle does not change in accordance with the change of the focal distance, it is necessary to form, into an image at a tele end corresponding position, a light ray from a range larger than the light ray formed into an image on the image pickup device 206 at a wide end corresponding position. In the example of FIG. 7B, it is necessary to also pass the light ray from a region A of the first group lens G1 to maintain the same image height as that in FIG. 7A. Therefore, the diameter of the first group lens G1 needs to be at least d1 or more.

In contrast, when the optical system is designed so that the size of the image circle changes in accordance with the change of the focal distance, the amount of letting out the first group lens G1 can be smaller than that in the example of FIG. 7B as shown in FIG. 7D, so that the length of a lens barrel for housing the optical system 102 can be reduced. Moreover, since it is no longer necessary to pass the light ray from the region A of the first group lens G1, the diameter of the first group lens G1 can be d2 smaller than d1. Thus, the optical system can be reduced in size.

According to the present embodiment, data indicating the correspondence between the value of the focal distance and the value of the size of the image circle is stored in the interchangeable lens 100. Thus, it is possible to cut out image data from the effective pixel region even if the size of the image circle changes. Moreover, the cut-out image data is subjected to the electronic zoom processing (enlargement processing) at the magnification which is determined in accordance with the data indicating the correspondence between the value of the focal distance and the value of the size of the image circle. Consequently, it is possible to achieve the optical system designed not to change the size of the image circle in accordance with the change of the focal distance and achieve high-power zoom, and also possible to generate a recording image or a display image of the same quality as the optical system designed not to change the size of the image circle in accordance with the change of the focal distance. Furthermore, if the performance of the electronic zoom processing is improved by the performance of the super-resolution processing and the higher pixels of the image pickup device 206, it is also possible to generate a recording image or a display image of higher quality.

While the present invention has been described above in connection with the embodiment, it should be understood that the present invention is not limited to the embodiment described above, and various modifications and applications can be made within the scope of the present invention.

For example, in the photography sequence in FIG. 3, the information regarding the focal distance (zoom position) is acquired during the lens communication performed at regular intervals. In contrast, a lens communication may be performed upon every operation of the zoom ring 108 to acquire the focal distance (zoom position), and image data may be cut out whenever the focal distance is acquired.

Image data may be cut out at the point of the live-view operation in S101 in FIG. 3.

If the correspondence between the value of the focal distance of the photographic lens 1021 and the value of the size (e.g., diameter) of the image circle is fixed at the design stage of the interchangeable lens 100, the correspondence data between the value of the focal distance and the value of the size of the image circle can be stored in the RAM 210 of the camera body 200. In this case, the cutout of the image data shown in FIG. 3 is performed when the interchangeable lens 100 in which the correspondence between the value of the focal distance of the photographic lens 1021 and the value of the size of the image circle is known is attached to the camera body 200.

Furthermore, when the correspondence data between the value of the focal distance and the value of the size of the image circle is stored in the ROM 212 of the camera body 200, the technique according to the present embodiment can also be applied to a lens-combined imaging apparatus in which the optical system 102 is provided inside the camera body 200. The imaging apparatus in this case does not need to be a digital camera, and can be various portable terminals such as a mobile telephone.

What is claimed is:

1. A camera system having an interchangeable lens and an imaging apparatus which the interchangeable lens is attached to or removed from,
the interchangeable lens comprising
an optical system which is variable in focal distance and in which a size of an image circle varies by the focal distance, the image circle being an effective image formation region of an optical image of a subject, the optical system having a wide-angle end and a tele-angle end, the focal distance being shortest at the wide angle end,
a lens data storage unit which stores data indicating a correspondence between the focal distance and a value of the size of the image circle, and
a lens interface unit which sends data indicating the correspondence to the imaging apparatus,
the imaging apparatus comprising
an imaging unit which obtains image data from the optical image formed on an image pickup device via the optical system,
an apparatus interface unit which receives the data indicating the correspondence from the lens interface unit, and
an image processing unit which cuts out image data corresponding to the image circle among image data obtained by the imaging unit on the basis of the data indicating the correspondence received by the apparatus interface unit and subjects the cut-out image data to changing processing having a magnification based on the data indicating the correspondence received by the apparatus interface unit,
wherein the optical system comprises a plurality of lens groups and is configured such that the size of the image circle is inversely proportional to the focal distance throughout a variable range of the focal distance, the variable range extending from the wide-angle end of the optical system to the tele-angle end of the optical system,
and
wherein the variable range of the focal distance throughout which the size of the image circle is inversely proportional to the focal distance.

2. The camera system according to claim 1, wherein the image processing unit cuts out image data in a relatively small region corresponding to a relatively high focal distance, and subjects the cut-out image data to changing processing having a relatively high magnification.

3. The camera system according to claim 1, wherein the image processing unit performs the changing processing so that the number of pixels in the cut-out image data is a predetermined number of pixels regardless of the focal distance.

4. The camera system according to claim 1, wherein a diameter of a lens group that is closest to the subject among the plurality of lens groups is smaller than in a case where an optical system is configured to maintain a size of an image circle within a variable range of focal distance, and wherein the optical system of the interchangeable lens has a length that is shorter than in a case where an optical system is configured to maintain a size of an image circle within a variable range of focal distance.

5. The camera system according to claim 1, wherein a relationship of the size of the image circle to the focal distance throughout the variable range of the focal distance is stored as a table in the lens data storage unit.

6. The camera system according to claim 1, wherein a relationship of the size of the image circle to the focal distance throughout the variable range of the focal distance is stored as a linear equation in the lens data storage unit.

7. The camera system according to claim 1, wherein a relationship of the size of the image circle to the focal distance throughout the variable range of the focal distance is stored as a curve equation in the lens data storage unit.

8. An imaging apparatus comprising:
an optical system which is variable in focal distance and in which a size of an image circle varies by the focal distance, the image circle being an effective image formation region of an optical image of a subject, the optical system having a wide-angle end and a tele-angle end the focal distance being shortest at the wide-angle end;
a data storage unit which stores data indicating a correspondence between a value of the focal distance and the size of the image circle;
an imaging unit which obtains image data from the optical image formed on an image pickup device via the optical system; and
an image processing unit which cuts out image data corresponding to the image circle among image data obtained by the imaging unit on the basis of the data indicating the correspondence and subjects the cut-out image data to changing processing having a magnification based on the data indicating the correspondence,
wherein the optical system comprises a plurality of lens groups and is configured such that the size of the image circle is inversely proportional to the focal distance throughout a variable range of the focal distance, the variable range extending from the wide-angle end of the optical system to the tele-angle end of the optical system,
and
wherein the variable range of the focal distance throughout which the size of the image circle is inversely proportional to the focal distance.

9. The imaging apparatus according to claim 8, wherein the image processing unit cuts out image data in a relatively small region corresponding to a relatively high focal distance, and subjects the cut-out image data to changing processing having a relatively high magnification.

10. The imaging apparatus according to claim 8, characterized in that the image processing unit performs the changing processing so that the number of pixels in the cut-out image data is a predetermined number of pixels regardless of the focal distance.

11. A control method of a camera system having an interchangeable lens and an imaging apparatus which the interchangeable lens is attached to or removed from,
the interchangeable lens comprising an optical system which is variable in focal distance and in which a size of an image circle varies by the focal distance, the image circle being an effective image formation region of an optical image of a subject, and the optical system having a wide-angle end and a tele-angle end, the focal distance being shortest at the wide-angle end, and
a lens data storage unit which stores data indicating a correspondence between the focal distance and a value of the size of the image circle,
the imaging apparatus comprising an imaging unit which obtains image data from the optical image formed on an image pickup device via the optical system,
the control method comprising:
cutting out image data corresponding to the size of the image circle among image data obtained by the imaging unit on the basis of the data indicating the correspondence received by the apparatus interface unit and the focal distance of the optical system; and
subjecting the cut-out image data to changing processing having a magnification based on the data indicating the correspondence,
wherein the optical system comprises a plurality of lens groups and is configured such that the size of the image circle is inversely proportional to the focal distance throughout a variable range of the focal distance, the variable range extending from the wide-angle end of the optical system to the tele-angle end of the optical system,
and
wherein the variable range of the focal distance throughout which the size of the image circle is inversely proportional to the focal distance.

12. The control method of the camera system according to claim 11, wherein in the changing processing, image data in a relatively small region corresponding to a relatively high focal distance is cut out, and the cut-out image data is subjected to changing processing having a relatively high magnification.

13. The control method of the camera system according to claim 11, wherein the changing processing is performed in the changing processing, so that the number of pixels in the cut-out image data is a predetermined number of pixels regardless of the focal distance.

14. A control method of an imaging apparatus including an imaging unit which obtains image data from an optical image formed on an image pickup device,
the imaging apparatus comprising an optical system which is variable in focal distance and in which a size of an image circle varies by the focal distance, the image circle being an effective image formation region of an optical image of a subject, and the optical system having a wide-angle end and a tele-angle end, the focal distance being shortest at the wide-angle end and
a lens data storage unit which stores data indicating a correspondence between the focal distance and a value of the size of the image circle, the control method comprising:
cutting out image data corresponding to the image circle among image data obtained by the imaging unit on the basis of the data indicating the correspondence and the focal distance of the optical system; and
subjecting the cut-out image data to changing processing having a magnification based on the data indicating the correspondence,
wherein the optical system comprises a plurality of lens groups and is configured such that the size of the image circle is inversely proportional to the focal distance throughout a variable range of the focal distance, the variable range extending from the wide-angle end of the optical system to the tele-angle end of the optical system,
and
wherein the variable range of the focal distance throughout which the size of the image circle is inversely proportional to the focal distance.

15. The control method of the imaging apparatus according to claim 14, wherein in the changing processing, image data in a relatively small region corresponding to a relatively high focal distance is cut out, and the cut-out image data is subjected to changing processing having a relatively high magnification.

16. The control method of the imaging apparatus according to claim 14, wherein the changing processing is performed in the changing processing, so that the number of pixels in the cut-out image data is a predetermined number of pixels regardless of the focal distance.

17. A control method of an imaging apparatus which obtains image data from an optical image formed on an image pickup device,
the imaging apparatus comprising an optical system which forms an optical image on the image pickup device and which is variable in focal distance and in which a size of an image circle varies by the focal distance, the image circle being an effective image formation region of an optical image of a subject, and the optical system having a wide-angle end and a tele-angle end, the focal distance being shortest at the wide-angle end,
the control method comprising:
cutting out image data in a relatively small region corresponding to a relatively high focal distance; and
subjecting the cut-out image data to changing processing having a relatively high magnification,
wherein the optical system comprises a plurality of lens groups and is configured such that the size of the image circle is inversely proportional to the focal distance throughout a variable range of the focal distance,
and
wherein the variable range of the focal distance throughout which the size of the image circle is inversely proportional to the focal distance.

18. The control method of the imaging apparatus according to claim 17, wherein the changing processing is performed in the changing processing, so that the number of pixels in the cut-out image data is a predetermined number of pixels regardless of the focal distance.

* * * * *